United States Patent [19]

Cavendish et al.

[11] Patent Number: 5,408,659

[45] Date of Patent: Apr. 18, 1995

[54] LINK PANE CLASS AND APPLICATION FRAMEWORK

[75] Inventors: Catherine J. Cavendish, Dallas; Ronald L. Baber, Bedford, both of Tex.

[73] Assignee: International Business Machines Corporation, Armonk, N.Y.

[21] Appl. No.: 846,654

[22] Filed: Mar. 5, 1992

[51] Int. Cl.⁶ .................... G06F 9/06; G06F 3/153
[52] U.S. Cl. ................ 395/650; 364/DIG. 1; 364/286.3; 364/254.6; 395/159
[58] Field of Search ............... 364/DIG. 1 MS File, 364/DIG. 2 MS File; 395/155, 157, 159, 650

[56] References Cited

U.S. PATENT DOCUMENTS

| | | | |
|---|---|---|---|
| 4,953,080 | 8/1990 | Dysart et al. | 364/DIG. 1 |
| 4,982,344 | 1/1991 | Jordan | 364/DIG. 2 |
| 5,008,853 | 4/1991 | Bly et al. | 364/DIG. 2 |
| 5,079,695 | 1/1992 | Dysart et al. | 364/DIG. 1 |
| 5,140,678 | 8/1992 | Torres | 395/159 |
| 5,159,669 | 10/1992 | Trigg et al. | 395/159 |
| 5,175,848 | 12/1992 | Dysart et al. | 364/DIG. 2 |
| 5,206,951 | 4/1993 | Khoyi et al. | 395/650 |
| 5,233,687 | 8/1993 | Henderson, Jr. et al. | 395/158 |
| 5,303,379 | 4/1994 | Khoyi et al. | 364/DIG. 1 |

*Primary Examiner*—Thomas M. Heckler
*Attorney, Agent, or Firm*—Gunn & Kuffner

[57] ABSTRACT

For use in a personal computer provided with at least two independent applications made available to a user at a graphic user interface, a desktop located icon, one or more, is shown so that the user may easily implement the link into one or the other of the available applications. The icon is implemented by a click and drag manipulation. This provides a link to application independent material, e.g., audio or visual relational database material. The applications can be enhanced selectively by the user through the graphic user interface.

10 Claims, 3 Drawing Sheets

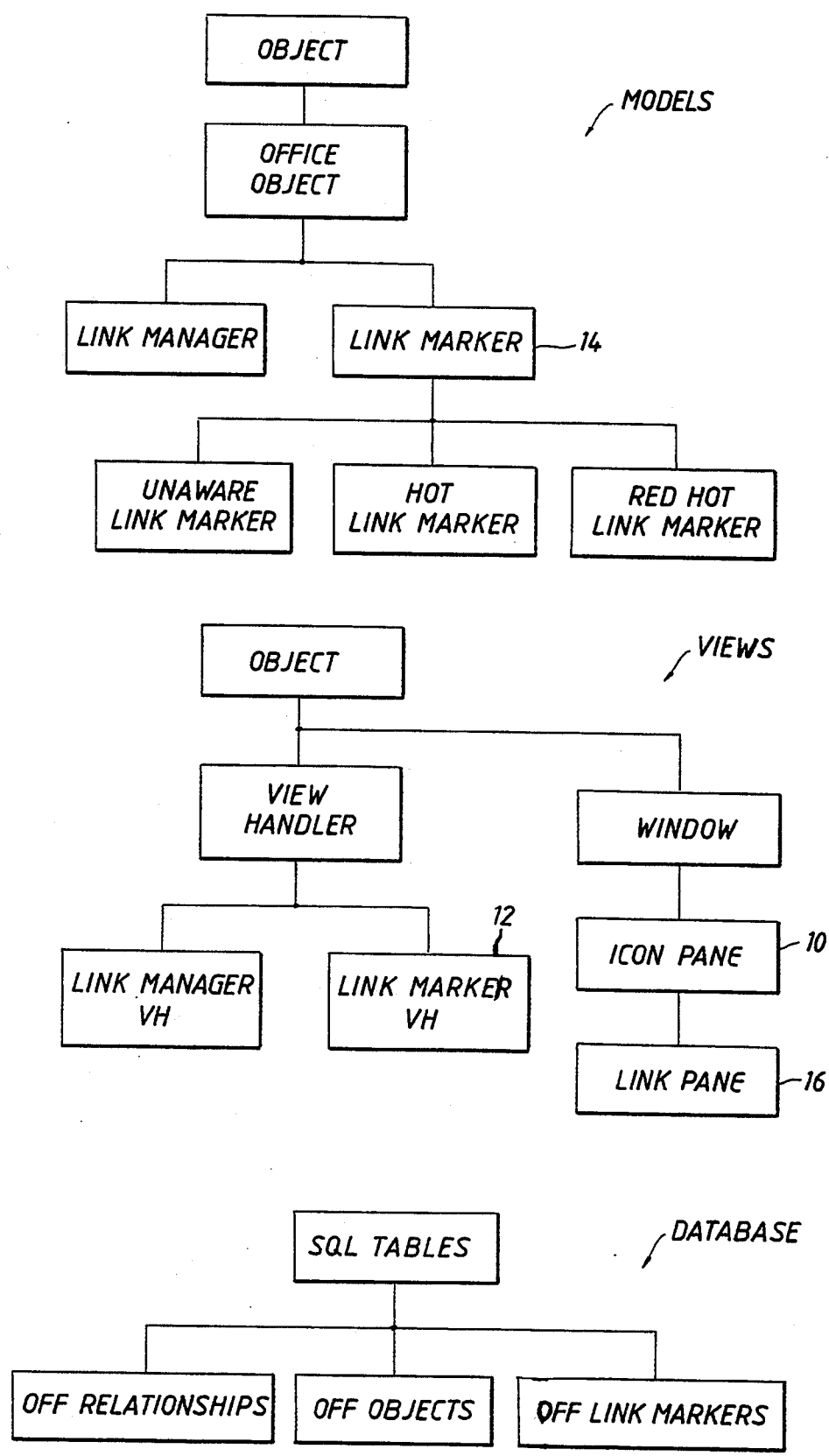

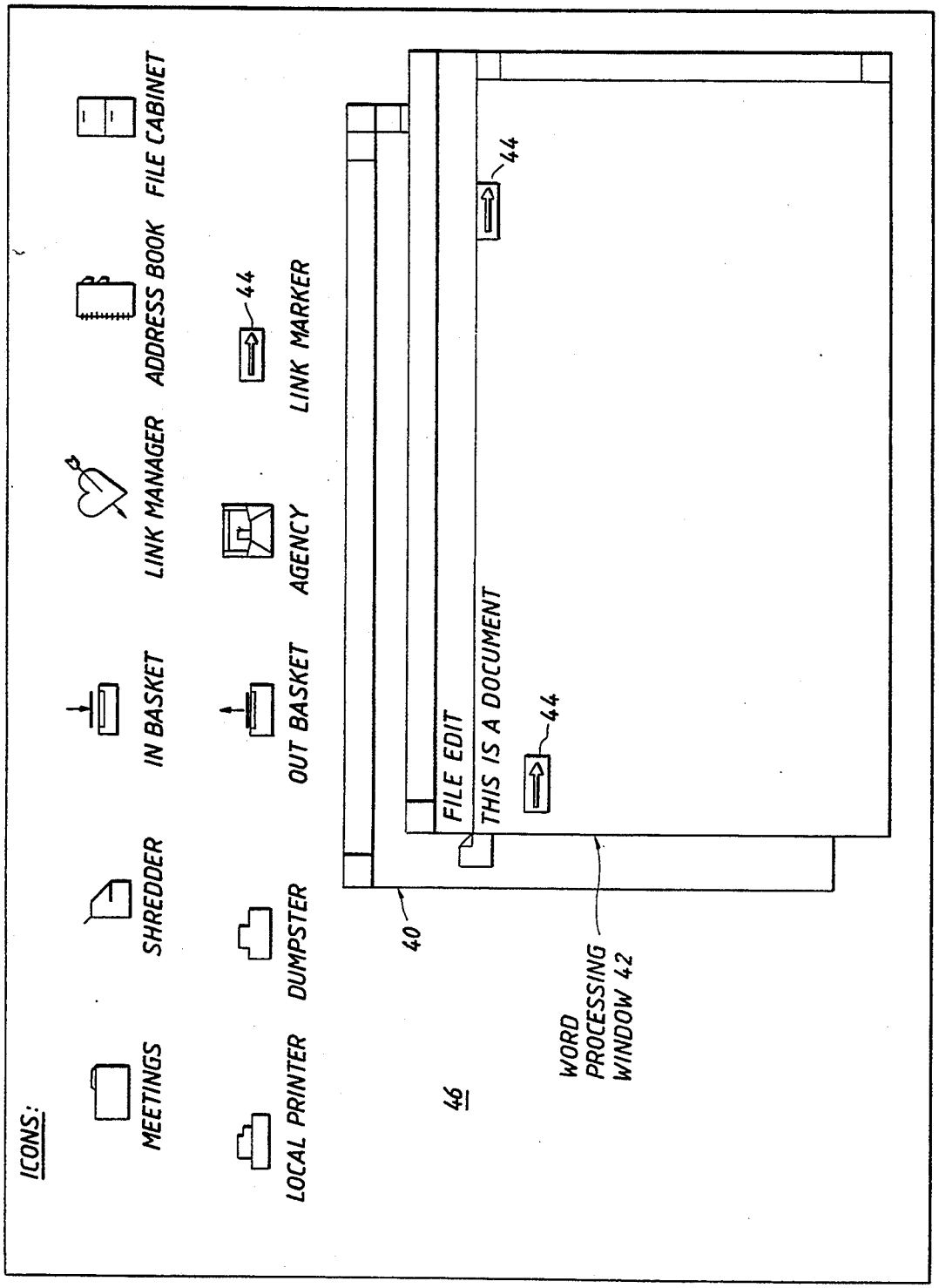

LINK PANE CLASS AND APPLICATION FRAMEWORK

FIELD OF THE INVENTION

This invention relates to a system and method for creating, manipulating, and displaying visual markers (referred to as Link Markers) which indicate the presence of a hypermedia link.

RELATED ART

The present disclosure is directed to a system which is used with personal computers (PC hereinafter). A typical PC includes its CPU with an appropriate memory which will be described hereinafter as the hardware. Without being overly specific, one typical implementation can be found in systems which use the Intel 80386 CPU family, or perhaps similar processors found in the Motorola 68000 series. Such a hardware system is normally operated with an operating system which provides various functions such as communications to a printer, retrieval of information from memory, transfer to memory and the like. Several operating systems will suffice for this and include systems such as UNIX, DOS, OS/2 and the like. In that context, a feature of an application framework is proposed by the present disclosure which incorporates a link pane class mechanism common to each and every specific software application. An application framework may be described briefly as a set of software services which make themselves available to applications running on a particular computer system. A brief example might be a communications service, which in a framework would offer its functionality for communicating with other computers to all participating applications, whereas were it not offered, each application would be required to perform its own communications function, leading to massive duplication among all the applications that require the communications capability. The massive duplication may be total, or partial, in that different applications deal with the common need (communication services in this example) in different measure. One application may need a complete communication service while another needs only partial aspects of that.

Software programs or applications may be typified by word processors, spreadsheets, accounting packages, or educational multimedia presentations. (For purposes of this disclosure, the terms "program" and "application" will be used interchangeably.) What is important in the present disclosure is the ability, in an application framework, of an optional feature to be inserted so that the common feature and advantages are inherently available to all applications which 1) execute on the computer system which also executes the application framework, and 2) which present a visual interface to the user by means of a graphical user interface. A graphical user interface will be described subsequently.

OBJECT ORIENTED ENVIRONMENT

In recent years, there has been a move toward creating and using computer programs in an "object oriented" environment. Object oriented technology is centered around two fundamental ideas namely, "class" and "object". Objects generally represent manipulatable items having specified attributes or characteristics, and the binding of these attributes or characteristics into an object is known as "encapsulation." A class is a template from which objects are made. It is like a cookie cutter but, in programming systems, it provides the added ability to define how that object, or cookie in this case, should behave.

The development of code for a class of objects defines the class properties (typically called its instance variables) which may include things such as its size, color and other attributes of the object, and the actions that the object can perform (called its methods); which may include, for example, a method to create new instance of itself, a method to draw itself on a computer screen and other methods which perform functions unique to the particular class itself.

The benefit of defining software units such as classes for a grouping of program functions is that if the code is written with sufficiently generic interfaces (the methods which can be called by other objects or code units), then the class will be easily reusable in a variety of different programs without having to customize it each time to fit the particular environment. The items which can be represented by objects include computer peripherals, computer programs, and documents. An example of such an object is one representative of a word processing document. Characteristics which might be encapsulated within this object include the ability to execute a word processing program and to read itself into that word processing program upon receiving a specific message from an I/O device (such as depressing the left button on a mouse).

DIRECT MANIPULATION

Visual objects are typically represented to a user via "icons", which are displayed on a visual display device. An icon for a word processing document might, for example, look like a small grey rectangle with the letters WP in it. Typically, an I/O device such as a mouse allows a user to point to an icon by generating a pointer marker representative of the I/O device "position" on the visual display device. The user can then use the I/O device to move that pointer marker to the icon on the visual display device.

The ability to move the pointer marker to the various icons on the visual display device permits a user to selectively utilize the characteristics of the objects. This is typically done by moving the icons to various locations on the visual display device, or by using an I/O device to send messages to the object pointed to directly. In this way, the icons allow a user to visually relate to the manipulation and interaction of objects within the object oriented environment.

An example of manipulating the objects using icons can be exemplified regarding a pointing device with reference to the word processing document example mentioned above. In that example, a user can manipulate the pointing device such that the pointer marker pointed to the icon represents the word processing document object. The user can then send the object a message (e.g., by depressing the appropriate button on a mouse), indicating that the object is to execute certain of its characteristics. In this example, those characteristics include executing the word processing program, and causing that program to read in the word processing document.

The above example is only one possible way that the objects can be manipulated in an object oriented environment to utilize the encapsulated characteristics of the objects. As indicated above, icons can typically be moved to other positions of the visual display device using the I/O device. For example, by using a cursor to point to an icon and depressing one of the buttons (e.g., the right button) on a mouse, a user can move or drag the icon around the screen by moving the mouse. Thus, if the user pushes the mouse to the right, the icon will move toward the right on the visual display device. Using again the present word processing example, this would allow a user to move one of the icons (either the word processing program or word processing document icon) on top of the other. In conventional object oriented environments, this interaction results in the execution of the word processing program, and causes that program to read in the word processing document. In general, the nature of the interaction of icons will depend upon the objects that the icons represent.

GRAPHICAL USER INTERFACE

A graphical user interface (GUI hereinafter) may be described as a facility provided by the application framework or by the operating system of the computer which presents the icons to the user via the display device, and, in addition, provides a graphical window on the display device for presentation to the user of the visual aspects of a program. Where icons are utilized, the program will be that which is represented by the icon as described above. Typically, multiple windows may be presented by a GUI, each displaying a running program. In addition, a GUI provides for user I/O via standardized methods such as menus, buttons, and the direct manipulation of objects described above.

MODEL/VIEW/CONTROLLER

One common organization of objects is exemplified in the context of a model/view/controller scheme, an example thereof being published in the SmallTalk 80 system of ParkPlace Systems. For definitional purposes, the model objects primarily include the data portion and the behavior of the data. By contrast, the view objects are window related objects which are provided to the user. This typically occurs in the context of a GUI which controls the display of the data from the model. The controllers are objects which control the interaction with the user through the GUI, typically by use of input/output devices such as a mouse. A modified scheme exists in which the controller functions are assumed by the view object, in which case the approach is typically termed by the name Model/View. An important feature of the present disclosure is the fact that the link pane class can be implemented in a model/view fashion, and is, strictly speaking, a view type object.

HYPERTEXT/HYPERMEDIA

In the generic and simplest sense, these terms mean touch and get. They embody the possibility of permitting an end user to touch (e.g., using some pointing device) an object (e.g., a word, phrase, graphical object, etc.) and thereby cause one or more associated information entities to be recalled from memory. A survey of hypertext systems is provided in "Hypertext: An Introduction Survey" by Jeff Conklin, IEEE Computer, September 1987, pp. 17–41, and "An Overview of Hypertext and Hypermedia", Concepts & Issues, McGraw-Hill, November 1989.

Hypertext is a term given to special text within a document which is generally highlighted and has special properties. One of these properties is that the word, phrase, or position (hereinafter called object) is linked to a particular object in a document, potentially even in a different document. Hypertext is generally used to allow the user to go directly to related information when the user activates the particular highlighted object in some way such as clicking the mouse over it. If the link map was represented in a graphical form, the highlighted object would be a node in the graph and the link would be an edge connecting it to another node, namely, the object to which it is linked.

Hypermedia is an extension of the idea of hypertext in that the objects being linked are not restricted to text-related objects but can also be video, audio, animations, bitmaps, and other types of data, enabling a wide range of related information to be potentially accessible from one point or node in the link map.

An object which associates a point in one object with a point in another object (or different point in the same object) is called a link. The typical visual aspect of a link is termed in this disclosure, and distinguished from the prior art, as a link pane. A link pane is an indication to the user that there may be one or more links present at this point (the link pane's location). If there are links emanating from a link pane and the link pane is triggered (e.g., by the user with a mouse), the link pane's links may be navigated. Link panes may be implemented to have several different appearance styles, for example push-buttons, icons or black frames, or may even be purposefully invisible on the display.

Consider as an example of hypermedia a text which is a treatise on some medical topic, and reference is made to the head of a patient. That connective link provided by the icon pane which is not otherwise viewable when viewing the text might show at the time of use to the icon an image of the human head contained within a window of the GUI, with perhaps two or three different sectional cuts through the head and labels identifying the various structural features of the head. Indeed, selection of any of these may well trigger inquiry into many aspects of the head at two or three levels in an organized hierarchy of data. The hierarchy can be organized in any suitable fashion as, for instance, external anatomical features can be collected in one hierarchy, and internal anatomical features can be collected and organized in another hierarchical fashion. Accordingly, that link pane symbolized by the simple word on the monitor may well provide a very substantial and large set of entries which are organized in the fashion mentioned. The interesting thing about that possibility is that several link panes can be used which enter the hierarchy at the highest level (e.g. at the head in this example) which image may itself contain an associated subset of data concerned with the anatomical aspects of the auditory system. Quite obviously, the same example could be extended to the eye and subsets relating to eyes and the optic nerves, etc.

BRIEF SUMMARY OF THE PREFERRED EMBODIMENT

This invention describes a generic unit, a class, as described above, for visually representing hypermedia links in a computer system having a graphic user interface. This invention alters or modifies the prior art definition of a link described above to allow the presence of link panes at locations on the panes which may be defined ahead of time and kept in a docket for use where needed, in arbitrary orders and positions defined by the user, and in any GUI window, irrespective of the program assigned to the window or display. In addition, link objects are extended by means of the link pane class to allow direct manipulation of those link objects.

The link pane class was developed as part of a hierarchy of classes where the so called model view scheme was used. The essence of this approach was in separating the model (or data) portion of an object from the view or displayable portion of the object. The link pane class provides the display and direct manipulation capability of hypermedia links for any program with a graphical user interface. The invention described herein was constructed using an object oriented programming language but there is no limitation which requires this to be the case. A procedural programming interface could be similarly constructed to perform the same actions. This invention extends the object based interface made popular by systems such as IBM OfficeVision, OS/2 2.0 WorkPlace Shell and the Apple Macintosh to hypertext and hypermedia. In other words, the visual indicator of a hypermedia link, called a link pane, may be manipulated by the user just as any other object in the system. It may be created from a class template, copied, or discarded. It may be moved to different locations within a window or to a different window in which a totally different program is running.

The present apparatus and method offer a different approach to that set forth in U.S. Pat. No. 4,982,344 which is directed to a link creation protocol. In that approach, a data card is created which carries with it all the data and requirements on the card; this inevitably enables the creation of multilevel data cards but that in turn creates a multi-link linked system which can become unwieldy when it reaches beyond a single level approach.

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 2 shows aspects of the model, view and database;

Figure 3:
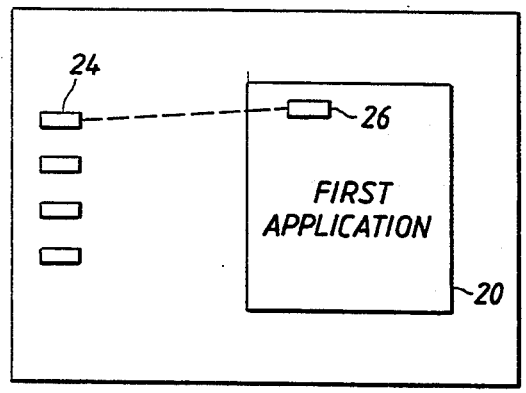
Figure 4:
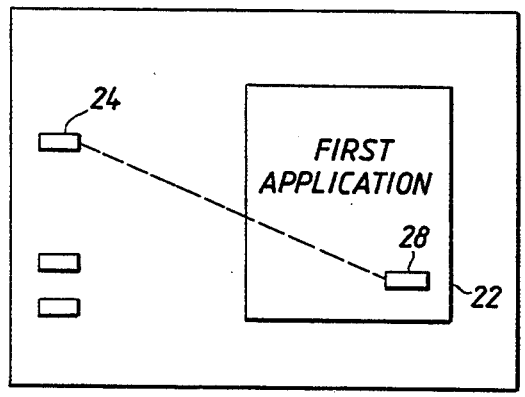
Figure 5:
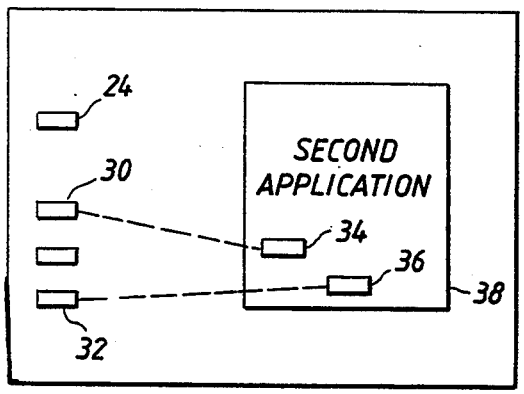

FIGS. 3, 4, and 5 each show different screens where several icons are presented which symbolize the link pane class, one or more, and further showing how they are implemented in multiple applications depicted on the respective screens; and FIG. 6 is a sample set of icons on the desktop.

DETAILED DESCRIPTION OF THE PREFERRED EMBODIMENT

Figure 1:
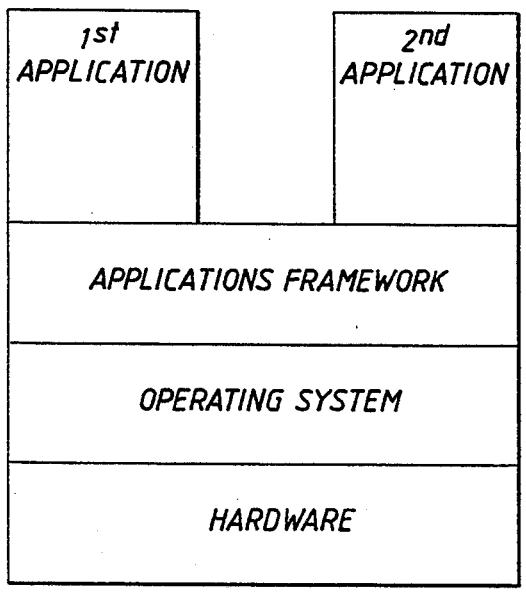
FIG. 1 is a block diagram schematic showing a relationship between models, view and database.

Considering now the present invention as shown in FIG. 1, it is a computer programming protocol which is best placed in context so that its use and application will be understood. It is normally used with a computer system which includes a CPU which has an attached memory. The computer system is normally connected with an output device which is ordinarily a terminal including a cathode ray tube (CRT) which provides the user with a visual output mechanism. That in turn normally presents symbols which are prompts to the user, and the symbols are usually shown as icons. The present invention features a model and view scheme which particularly incorporates the link pane which will be described in the GUI for ease of use.

Referring to the previous discussion of model view relationships, the link pane object corresponds to the view of such a relationship. There exists another supporting class called the link marker which functions as the model in this relationship. Program ownership, screen position, linking behavior and other properties of link panes are automatically and dynamically recorded in a link marker object, which in turn has methods which allow it to access database management objects which in turn store these link marker properties in a SQL (Structured Query Language) database of information. Being an object like any other object in an object oriented implementation of computer software, link markers may be instantaneous manifestations of certain unique properties, kept on the graphical interface "workspace" or "desktop" until needed (the terms "workspace" and "desktop" referring to that marginal area of the computer screen not occupied by GUI windows), and are then moved to the window running a program. When a marker is selected for execution by the user, typically by using a mouse device, any arbitrary program or suite of programs can be executed, defined when the link marker is initially created by the user.

Link panes are placed on the GUI as needed, gaining flexibility in altering the system to changing needs because the positioning of particular link panes is not fixed statically by professional programmers, but may be placed dynamically by any end user, and provide greater flexibility.

An additional concept embodied in this invention is that link pane positioning and behavior are managed independently of the program appearing in the GUI window(s) in which the link panes be placed. In fact, a program may in some cases may be totally unaware that a link marker has been placed within the GUI window which visually represents that program. Link markers may be moved from program to program at will, or kept in reserve in the workspace until needed and actually moved into place.

By resort to the link pane which is available, it is possible to provide workplace capabilities such that the performance of the system is completely and totally adaptive to the needs of the user. It is therefore a feature which can be momentarily neglected or can be used with practically every GUI window in various or typical situations. Situations given above and representative applications include text documents wherein links extend from particular words or other identifiers in the text, numeric systems where icons can be emblazoned on particular numeric entries, and the mixed type of system where text or numbers might appropriately link to something other than text or numbers, e.g. graphics, and any other appropriate data source such as audio files. Because of the commonality in the link pane symbol and the commonality in the connective link from the linked item to the hidden item, it is therefore possible to systematically make such references by means of the easily implemented icons. Ordinarily, the icons can be accessed by means of a cursor which is manipulated by means of a mouse or alternately by means of a keyboard control. When the cursor is moved to the icon, the icon can be triggered into action so that the link is then actually implemented. In that sense, it would require only two steps, the first being to call up the desired icon and the second step is execution of the icon; one example would be the display of selected icons at one side or across the top of a screen workplace and implementation by moving a cursor to the selected icon which is then called into action by clicking on the icon. The icon is dragged into the application. Alternately, the icons can be placed in the midst of the window so that they are scattered throughout the numeric entries, through the text material or other window defined material.

Going now to FIG. 1 of the drawings, it is believed that the relationship between the hardware and operating system is readily understood. Within the context of the present disclosure, an applications framework is provided which utilizes or makes available link panes in accordance with the teachings of the present disclosure. Moreover, it is available for use in first, second and multiple specific application procedures. As will be understood, the availability of the link pane class is for all the applications which are mounted on the applications framework as represented in FIG. 1 and therefore enables implementation during execution of the first, or perhaps the second application, or any other application that is called for.

FIG. 2 of the drawings shows the model and view scheme. Primarily, objects and their containments or other relationships are dynamically stored in persistent storage in a relational database so that there is a set of classes of objects. The objects include model and view objects. The definitions of these are believed to be well known and are further repredented in FIG. 2 of the drawings. In particular, the link pane 16 shown in FIG. 2 is incorporated as part of a framework of link objects which separate the view presentation and its implementation from the data. The data is handled in the model objects separately depicted in FIG. 2. The icon pane is associated with a link marker view handler 12 which is specific for the particular icon which handles or which manages aspects of the display such as its location on the screen or window, mode of manipulation and other details of its graphic or visual representation. The model objects are thus shown in FIG. 2 and incorporate the link marker 14 which is associate with the particular icon pane 10 and the represented link pane 16. The link pane class provides or is part of the view function (not the data function) and thus enables the visual presentation.

As shown in FIG. 2, there is a class hierarchy involved with the link pane 16. There can be any degree of complexity or simplicity in the link pane 16 and the associated link marker 14. The link marker can involve priorities of link markers such as the hot link marker or the red hot link marker. However, this relates to data handling and is not of particular concern to the present disclosure which is more generally focused on the view seen in the window and its mode of manipulation. Likewise, the link marker can be an aware link marker or one which is an unaware link marker, again as shown in FIG. 2. In either case, the link pane 16, having the characteristics of the view objects, provides the appropriate window or screen icon which is handled during manipulation.

FIGS. 3, 4 and 5 show several different applications which are represented as the first application, second application, etc. on the screens. The precise nature of the first, second, and following applications is not critical. What is shown in these three respective views are the desktop location icons, typically being several such icons which are available. As the first application, second application, or any other application is being run during program execution, there will be a window(s) related to the first application, second application, etc. This window is shown in FIG. 3 and is identified by the numeral 20 which specifies the first application as viewed by the user. FIG. 4 shows another screen 22 which can be the same or which can be different from the screen 20 in FIG. 3. The windows are resultant of the normal and conventional use of a selected application. The significant point is that the first application at two separate locations may provide a convenient point, one or more, where a particular icon is desired or needed. Accordingly, the user need only move a cursor to the icon 24. The icon 24 is one of several shown on the desktop, each providing different virtues or features. The icon 24 is located by moving a cursor to it, typically through mouse manipulation, clicking the mouse on the icon 24 and then dragging the icon 24 to the respective locations in the first application. FIG. 3 shows that it is moved to a location 26 while its moved to another location 28 in FIG. 4.

Contrast FIGS. 3 and 4 with FIG. 5; FIG. 5 shows a different set of icons which include the icons 30 and 32; in the same fashion, they are dragged to the locations 34 and 36 in a second application having a screen 38 which is visible to the user. FIG. 6 jointly shows a variety of icons for a desktop, next to first and second windows 40 and 42; the link marker 44 is shown on the window 42 after dragging from the desktop 46 above the two windows.

Considering the windows which are represented in FIGS. 3, 4, and 5 together, it will be understood how a particular icon is presented and available to the user. The user may be executing a first application, or any of several applications. The particular icon 24 may not be needed except in one application, while by contrast, the icon 30 may be needed several times in several applications. These icons are simply available and can be used on a routine basis by the user simply by clicking and dragging to locate the icons at the particular desired locations in the applications. On the surface, this is carried out as depicted in FIGS. 3, 4, and 5. This is one of the benefits of the interchangeability of the link pane class so that it can be manipulated from the GUI by the user without difficulty in interconnection or coordination to various programs. The view transport is accomplished in the easiest possible fashion as exemplified by dragging with the cursor from the desktop into one or more windows. This enables the view to be easily controlled without concern for or involvement in the data handling, i.e. is there a different mode of data input, manipulation, and output determination from the first to the second to the last application. Each application can be quite different from other applications; even so, the icon movement and insertion into a window of an application is overtly simple, and done via GUI window manipulation. In summary, simple view manipulation enables the view objects to be moved from application to application as required.

While the foregoing is directed to the preferred embodiment, the scope thereof is determined by the claims which follow:

We claim:

1. A method for modifying at least two applications executed by a computer provided with an operating system comprising the steps of:

(a) forming a link pane displayed as an icon visible at a graphic user interface wherein the link pane is independent of said applications;

(b) executing a first application in the computer wherein the execution includes presentation of a window associated with the first application;

(c) dragging by cursor movement the icon representing the link pane from the graphic user interface location initially independent of application wherein the link pane is positioned in the first application depicted by its window;

(d) inserting the icon representing the link pane into the first application;

(e) executing a second application in the computer wherein the execution includes presentation of a window associated with the second application;

(f) dragging by cursor movement the icon representing the link pane from the graphic user interface location initially independent of application wherein the icon representing the link pane is positioned in the second application depicted by the window; and (g) inserting the icon presenting the link pane into the second application.

2. The method of claim 1 wherein the icon is available for at least two applications and is moved subject to user control into the two applications.

3. The method of claim 2 wherein respective screens are presented for the first and second applications under user control, and the icon is moved under user control into the first and second applications.

4. The method of claim 3 wherein the icon is one of plural icons available for user selection initially independent of application and wherein link panes represented by respective icons are implemented by dragging a representative icon into the application.

5. A method of modifying at least two applications in memory in a computer system and which are respectively represented by various screens of the computer system output screen unique to the two applications at a graphic user interface presented by the computer system wherein the method comprises:

(a) representing a link pane class in memory of a computer system by a visible icon independent of application on a graphic user interface accessible by a user of the computer system;

(b) associating the link pane class with a handling capability, defining a model object wherein said model object is not displayed at the interface and is executed by the computer system in the at least two applications;

(c) independently of application, moving the link pane class into a particular application by moving an icon on the graphic user interface into a screen associated with a particular application; and (d) executing the link pane class after insertion into the particular application represented by the screen at the graphic user interface.

6. A system for linking objects in an object oriented environment including at least two applications in memory in a computer system wherein the computer system includes an output screen, the system comprising:

(a) an interface cooperative with a computer system output screen between a user and said object oriented environment in memory in a computer system for forming and displaying a link pane in memory in the computer system and represented by an icon at an output screen for a link, said link being actuatable on manipulation of said link pane by the user;

(b) a model object in memory in a computer system and associated with said link pane, said model object accessible in response to user manipulation at said interface, said model object common to at least two applications in said memory and accessed through said interface, wherein said model object is not displayed at the interface and is executed in the at least two applications.

7. The system of claim 6 wherein said link pane visually represents a fixed subroutine.

8. The system of claim 7 wherein said link pane is independent of the two applications.

9. The system of claim 6 wherein said icon is visually displayed for the user, and including means for placing the link pane in said two applications.

10. The system of claim 6 wherein said link pane includes a fixed icon; and said icon can be dragged into applications for user controlled implementation.

* * * * *